United States Patent
Allgaeuer et al.

(10) Patent No.: US 10,836,233 B2
(45) Date of Patent: Nov. 17, 2020

(54) HEATING SYSTEM FOR AN ELECTRIC OR HYBRID VEHICLE, AND METHOD FOR OPERATING SUCH A HEATING SYSTEM

(71) Applicant: Bayerische Motoren Werke Aktiengesellschaft, Munich (DE)

(72) Inventors: Christian Allgaeuer, Munich (DE); Oliver Horn, Munich (DE); Markus Moser, Oberschleissheim (DE); Nicolas Flahaut, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 74 days.

(21) Appl. No.: 15/958,194

(22) Filed: Apr. 20, 2018

(65) Prior Publication Data
US 2018/0236842 A1 Aug. 23, 2018

Related U.S. Application Data

(63) Continuation of application No. PCT/EP2016/074451, filed on Oct. 12, 2016.

(30) Foreign Application Priority Data

Oct. 22, 2015 (DE) .................. 10 2015 220 623

(51) Int. Cl.
 *B60H 1/00* (2006.01)
 *B60H 1/32* (2006.01)
 *B60H 1/14* (2006.01)

(52) U.S. Cl.
 CPC ......... *B60H 1/00278* (2013.01); *B60H 1/004* (2013.01); *B60H 1/00385* (2013.01);
 (Continued)

(58) Field of Classification Search
 CPC .............. B60H 1/321; B60H 1/00785; B60H 2001/00949; B60H 2001/00107;
 (Continued)

(56) References Cited

U.S. PATENT DOCUMENTS

| | | |
|---|---|---|
| 2004/0011070 A1 | 1/2004 | Satzger |
| 2005/0039878 A1 | 2/2005 | Meyer et al. |

(Continued)

FOREIGN PATENT DOCUMENTS

| | | |
|---|---|---|
| CN | 1300254 A | 6/2001 |
| CN | 102692095 A | 9/2012 |

(Continued)

OTHER PUBLICATIONS

German Search Report issued in counterpart German Application No. 10 2015 220 623.8 dated Jun. 22, 2016 with partial English-language translation (Eight (8) pages).

(Continued)

*Primary Examiner* — Frantz F Jules
*Assistant Examiner* — Lionel Nouketcha
(74) *Attorney, Agent, or Firm* — Crowell & Moring LLP

(57) ABSTRACT

A heating system for an electric or hybrid vehicle is provided. The heating system includes a refrigerant circuit, a heater heat exchanger which is arranged in a heating circuit, for air-conditioning the interior, a high-voltage storage device which is arranged in an HVS circuit, and a cooler which is arranged in a cooling circuit. The heating circuit, the HVS circuit, and the cooling circuit are integrated into a common coolant circuit. In a first HVS cooling operation, the HVS circuit is separated from the cooling circuit and connected to a chiller in order to discharge heat into the refrigerant circuit. In a second HVS cooling operation, the HVS circuit is connected to the cooling circuit via a chiller bypass in order to discharge heat via the cooler.

20 Claims, 4 Drawing Sheets

(52) U.S. Cl.
CPC ..... *B60H 1/00392* (2013.01); *B60H 1/00899* (2013.01); *B60H 1/32284* (2019.05); *B60H 1/143* (2013.01); *B60H 2001/00307* (2013.01); *B60H 2001/00928* (2013.01)

(58) Field of Classification Search
CPC ...... B60H 1/00278; B60H 2001/00928; B60H 1/143; B60H 1/00899; F25B 2700/11; F25B 1/00; F25B 47/02; F25B 47/022; F25B 5/02; F25B 6/02; F25D 21/004
See application file for complete search history.

(56) References Cited

U.S. PATENT DOCUMENTS

| | | | | |
|---|---|---|---|---|
| 2012/0180986 | A1* | 7/2012 | Mathews | F25B 29/003 165/63 |
| 2012/0247716 | A1* | 10/2012 | Galtz | B60H 1/00278 165/42 |
| 2012/0304674 | A1* | 12/2012 | Schwarzkopf | B60H 1/00385 62/79 |
| 2013/0152611 | A1* | 6/2013 | Furll | B60H 1/00921 62/79 |
| 2014/0298849 | A1* | 10/2014 | Alpha | F25B 41/003 62/404 |
| 2015/0101789 | A1 | 4/2015 | Enomoto et al. | |
| 2015/0362268 | A1* | 12/2015 | Maeda | G05D 23/1917 165/294 |
| 2017/0253105 | A1 | 9/2017 | Allgaeuer et al. | |

FOREIGN PATENT DOCUMENTS

| | | | |
|---|---|---|---|
| DE | 10 2004 014 847 | A1 | 3/2005 |
| DE | 10 2011 016 070 | A1 | 10/2012 |
| DE | 10 2012 024 080 | A1 | 3/2014 |
| DE | 102012024080 | A1 * | 3/2014 |
| DE | 10 2012 108 043 | A1 | 5/2014 |
| DE | 10 2013 206 630 | A1 | 10/2014 |
| DE | 10 2014 226 346 | A1 | 6/2016 |
| EP | 1 086 837 | A1 | 3/2001 |

OTHER PUBLICATIONS

International Search Report (PCT/ISA/210) issued in PCT Application No. PCT/EP2016/074451 dated Jan. 25, 2017 with English-language translation (Six (6) pages).
Japanese-language Written Opinion (PCT/ISA/237) issued in PCT Application No. PCT/EP2016/074451 dated Jan. 25, 2017 (Five (5) pages).
Chinese Office Action issued in Chinese application No. 201680043636.1 dated Jan. 13, 2020, with English translation (Twenty One (21) pages).

* cited by examiner

HEATING SYSTEM FOR AN ELECTRIC OR HYBRID VEHICLE, AND METHOD FOR OPERATING SUCH A HEATING SYSTEM

CROSS REFERENCE TO RELATED APPLICATIONS

This application is a continuation of PCT International Application No. PCT/EP2016/074451, filed Oct. 12, 2016, which claims priority under 35 U.S.C. § 119 from German Patent Application No. 10 2015 220 623.8, filed Oct. 22, 2015, the entire disclosures of which are herein expressly incorporated by reference.

BACKGROUND AND SUMMARY OF THE INVENTION

The invention relates to a heating system for an electric or a hybrid vehicle with a refrigerant circuit, with a heater heat exchanger, which is arranged in a heating circuit, for interior-space air-conditioning with a high-voltage storage device, which is arranged in an HVS circuit, and with a cooler, which is arranged in a cooling circuit. The heating circuit, the HVS circuit and the cooling circuit are integrated into a common coolant circuit. In a first HVS cooling mode, the HVS circuit is separated from the cooling circuit and connected to a chiller for heat dissipation into the refrigerant circuit. Furthermore, the invention relates to a method for operating the heating system.

Such a heating system is, for example, described in DE 10 2014 226 346 A1 tracing back to the applicant.

For the air-conditioning of various components of a vehicle, principally, it is initially possible to air-condition each component by way of a dedicated separate cooling circuit independently, that is to say autonomously and in a manner fluidly separated from one another. However, this is very laborious, which is why, for example, in the aforementioned DE 10 2014 226 346 A1, a combined cooling solution is described, where a plurality of cooling circuits are integrated into a joint heating system. In the heating system described there, an NT component, an intercooler, a heat source and a combustion motor are connected to a joint cooling circuit so that, in various operating states of the heat system and in accordance with the thermal requirements of each individual component, an optimal air-conditioning of the components occurs.

In general, integrated concepts for air-conditioning a plurality of components of a vehicle result in a higher amount of wiring work and an interconnection structure, which is particularly characterized by a variety of valves.

Against this background, it is an object of the invention to indicate an improved heating system that ensures the most versatile and efficient air-conditioning of various components of a vehicle possible with the least amount of interconnection work possible. Thereby, the heating system should, in particular, also support such operating modes that are especially suitable for air-conditioning in the case of an electric or hybrid vehicle.

This and other objects are achieved by way of a heating system as well as by way of a method according to embodiments of the invention. Advantageous embodiments, further embodiments and variations are provided. Thereby, the embodiments also apply to the method in relation to the heating system analogously and vice versa.

The heating system is designed for use in an electric or hybrid vehicle. The heating system has a heater heat exchanger, which is arranged in a heating circuit, for interior-space air-conditioning, a high-voltage storage device, which is arranged in an HVS circuit, and a cooler, which is arranged in a cooling circuit. Thereby, the three circuits, namely the heating circuit, the HVS circuit and the cooling circuit are integrated into a common coolant circuit, in which a coolant circulates. In addition, the heating system has a separate refrigerant circuit, in which a refrigerant circulates.

The heating system can be operated in various operating modes, which, in particular, are set by the control unit according to the requirements at hand. In a first HVS cooling mode, the HVS circuit is separated from the cooling circuit and connected to a chiller for heat dissipation into the refrigerant circuit. In a second HVS cooling mode, the HVS circuit is connected to the cooling circuit via a chiller bypass for heat dissipation via the cooler.

The three circuits are principally connected to each other over a number of lines on a fluid-technical level, meaning hydraulically, so that, depending on the operating mode, an exchange of coolant takes place between the circuits. In particular, under the term separated, it is understood that the respective circuit is merely blocked, more preferably, by way of an appropriate valve so that no exchange of coolant takes place between the separated circuit and the remaining circuits.

An essential advantage achieved by the invention particularly consists in that the high-voltage storage device can be cooled by way of both of the HVS cooling modes in various ways. In other words: the waste heat generated by the high-voltage storage device during operation can be dissipated in a flexible manner, namely, on the one hand, via the cooler, and via the refrigerant circuit on the other. Thereby, the first HVS cooling mode is then preferably configured if a comparably high outer temperature, for example, within the range of 20° C. or more, is present and heat dissipation into the environment via the cooler is only possible to a limited extent. The required cooling performance is then realized by way of the refrigerant circuit. In the case of lower outer temperatures, the second HVS cooling mode is then preferably set, for example, lower than 20° C. In this case, efficient heat dissipation via the cooler is possible and using the refrigerant circuit to cool the high-voltage storage device is done without so that, all in all, energy is saved. There is thus advantageously a resulting choice with regard to the dissipation of waste heat of the high-voltage storage device. This choice, in particular, is achieved by specially wiring the circuits with each other and the integration into the joint refrigerant circuit associated therewith. As a result, the heating system is constructed in an especially simple manner and is efficient as well.

The high-voltage storage device is an energy storage device, which primarily serves to supply an electric drive train of the vehicle in particular, meaning for the propulsion of the vehicle. In addition however, it is also possible to take electrical energy from the high-voltage storage device to supply other components of the vehicle.

In a preferred embodiment, the heating system has a valve arrangement with a plurality of switch positions to switch between the first and the second HVS cooling mode. Thereby, in a first switch position, the high-voltage storage device and the chiller are connected in series and, in a second switch position, the high-voltage storage device and the cooler are connected in series. Switching between both switch positions then changes between both HVS cooling modes and the high-voltage storage device is either connected downstream to the battery or to the cooler. Therefore, the coolant initially flows through the high-voltage storage device and then either through the chiller or the cooler in a given HVS cooling mode. Principally, an embodiment is also contemplated and suitable, in which a joint series connection of the high-voltage storage means, the chiller and the cooler can be configured.

In the first switch position, the HVS circuit is then closed so that the coolant can circulate in it. Thereby, the heating circuit and the cooling circuit are separated from the HVS circuit. On the contrary, in the second switch position, the heating circuit is only separated from the HVS circuit so that an inflow of coolant from the heating circuit is effectively hindered. In contrast, the cooling circuit is then connected to the HVS circuit in order to implement the series connection of the high-voltage storage means to the cooler.

In the first HVS cooling mode, the HVS circuit is operated separately, meaning coolant is recurrently led through the high-voltage storage device and the chiller without reaching other areas of the coolant circuit. In order to appropriately circulate the coolant within the HVS circuit, there is, in particular, an HVS circuit pump arranged within this. In an appropriate embodiment, the coolant then flows through the HVS-circuit pump, the high-voltage storage device, the chiller and the valve arrangement successively in this order.

In order to circulate the coolant within the cooling circuit, more preferably, a cooling circuit pump is arranged within it, for example, downstream from the cooler; as an alternative upstream to the cooler. The positioning of the cooling circuit pump is, in particular, dependent upon marginal conditions, such as pressure loss, pump type and/or bulk current requirements within the coolant circuit and is therefore expediently selected with regard to these marginal conditions.

In the second HVS cooling mode, the HVS circuit is connected to the cooling circuit, in particular, via an HVS feed and/or an HVS return line. In particular, in the coolant circuit downstream from the high-voltage storage device, there is an HVS branch, downstream from which, in one direction, the chiller is arranged and, in another direction, the chiller bypass to circumvent the chiller. Switching between both HVS cooling modes then redirects at this HVS branch according to the coolant flow. In the second HVS cooling mode, in addition, only a partial section of the HVS circuit is operated; so no coolant circulates through the HVS circuit, rather, the partial section, on which the high-voltage storage device is arranged, forms an auxiliary branch of the cooling circuit so that the coolant flows through the cooler downstream from the high-voltage storage device. In this configuration, the chiller bypass serves, in particular, as a return flow line for the auxiliary branch and via this return flow line, the auxiliary branch is connected to the cooling circuit.

The chiller is designed as an evaporator for the heat exchange between the refrigerant in the refrigerant circuit and the coolant in the coolant circuit. To set the overheating of the refrigerant, an appropriate expansion element is connected upstream to the chiller in the refrigerant circuit. The mass flow of refrigerant through the chiller is, in particular, provided by a compressor, which is arranged downstream from the chiller and the refrigerant is carried to higher pressure and temperature level. Then, the compressed refrigerant flows through a condenser, via which the heat is emitted from the refrigerant circuit again.

In an expedient variation, an additional compressor is operated in parallel to the compressor, which then switches on simultaneously in the event of a correspondingly high air-conditioning demand. The additional compressor then makes it possible to improve the performance of the refrigerant circuit if required. The use of a second compressor, namely the additional compressor, has the benefit of being able to achieve a considerably higher level of cooling performance in relation to an individual compressor, which is identical in construction. In addition, in the embodiment with the additional compressor, at the same level of performance, both compressors are respectively operated at a lower level than when only a single compressor is used, which, in comparison therewith, runs at a higher level. By way of this, considerably better acoustics are achieved, meaning that the refrigerant circuit is quieter during operation. Preferably, the compressor and the additional compressor are even identical in construction so that the refrigerant circuit, according to a modular principle, can be equipped with an air-conditioning performance that is appropriate for a respective vehicle while simply using a corresponding number of compressors.

In addition, an air-conditioning evaporator is expediently arranged within the refrigerant circuit, which is simultaneously operated with the chiller and serves to cool an interior. Accordingly, the heating system then has an interior cooling mode, in which heat, which flows into the interior, is absorbed into the refrigerant circuit via the air-conditioning evaporator. The heater heat exchanger and the air-conditioning evaporator are then respectively an integral part of the air-conditioning unit, by way of which the interior both can be heated as well as cooled.

In a suitable further embodiment, in order to increase performance and efficiency, an inner heater heat exchanger is furthermore arranged within the refrigerant circuit, which creates a heat exchange between the suction line upstream to the compressor, meaning on its suction side, and the liquid line downstream from the condenser.

In a preferred further embodiment, the heating system has a heat pump mode, in which the heating circuit is separated from the cooling circuit and, in which, by way of a condenser, which is arranged within the heating circuit, heat dissipation from the refrigerant circuit occurs for heating an interior. Thereby, the condenser is designed as a water-cooled condenser, namely similar in the way the chiller is designed as a heater heat exchanger, for the heat exchange between the refrigerant circuit and the coolant circuit, in more precise terms, the heating circuit. In heat pump mode, a heat pump function is implemented by way of the refrigerant circuit, and the refrigerant circuit is used to transfer heat from the chiller and/or from the air-conditioning evaporator into the heating circuit. In this way, an efficient heat utilization of the waste heat of the drive train, of the high-voltage storage device and of the ambient heat is realized. The heat available in the coolant circuit is specifically fed to the heating circuit and thus the heater heat exchanger and then used for interior-space heating. Thereby, the heat pump mode primarily and particularly serves to solely heat an interior.

Similar to the HVS circuit, the heating circuit is expediently connected to the cooling circuit via a heating feed line and/or a heating return. In a preferred embodiment, the heating system then has a heating circuit valve, by way of which the heating circuit can be separated from the cooling circuit. For this reason, the heating circuit valve is closed or also blocked off. The heating circuit valve is expediently arranged in the heating feed line of the heating circuit. In a suitable embodiment, the heating circuit valve is a stop valve.

Being similar to the HVS circuit, the heating circuit is also operated as a loop in its separated state, along which a coolant is then initially led over a condenser and then over a heater heat exchanger in a reoccurring manner. In particular, a heating circuit pump is additionally arranged within the heating circuit in order to achieve suitable coolant circulation. The heat emitted into the heating circuit via the condenser is then fed to the heater heat exchanger and used for interior-space heating. If, on the contrary, no interior-space heating takes place, the heating circuit is connected to the cooling circuit and, to that end, in particular, the heating circuit valve is opened so that the condenser, the heater heat exchanger and the cooler are then successively activated. Heating via the heater heat exchanger is then avoided by blocking this on its air side; in other words: warm coolant possibly flows through the heater heat exchanger, however, no air circulation occurs so that no heated air is fed into the interior and the interior is accordingly not heated.

In a beneficial embodiment, in the case of an open heating circuit that is connected to the cooling circuit, an undesired bypass of the condenser is hindered, in particular, by the heating circuit only being flown through section by section, thereby expediently securing the remaining heating circuit by way of a heating circuit check valve. In the case of an open heating circuit, the condenser and the heater heat exchanger are only flown through, however, not the remaining heating circuit. For this purpose, the heating circuit check valve is arranged in the heating circuit in particular, upstream to the condenser and to a connection to the heating circuit feed line so that the coolant can only flow in the direction of the condenser starting from the heating circuit return and not additionally in the opposing direction.

If the heat influx through the condenser is greater than the heat that is dissipated via the heater heat exchanger, for example, in the case of a low level of heat performance demand, in a beneficial further embodiment, a mixed mode is set by incrementally adjusting the heating circuit valve, meaning part of the heat is then dissipated into the ambient environment via the cooler.

A combination of the first HVS cooling mode with the heat pump mode is especially advantageous so that the waste heat of the high-voltage storage device is used for interior-space heating. Preferably, in accordance therewith, the heating system can be operated in the heat pump mode and in the HVS cooling mode at the same time to supply the heater heat exchanger with the high-voltage storage device's waste heat by way of the chiller and the condenser. By way of this, an especially efficient combination mode is implemented, in which both the heating circuit as well as the HVS circuit are separated from the cooling circuit and the high-voltage storage device's waste heat is transferred directly into the heating circuit by way of the refrigerant circuit.

Expediently, other components of the vehicle are still integrated into the coolant circuit so that, all in all, an especially efficient heating system is formed, by way of which the waste heat of various components is simply dissipated. Examples of such components include the drive train of the vehicle, power or charging electronics. In the case of a hybrid vehicle, this also includes an intercooler or the like. Thereby, a corresponding component primarily includes a heat source, which is connected to the cooling circuit in a suitable embodiment of the heating system and is connected to the cooler in series. In this way, the heat source's waste heat can initially then be dissipated into the ambient environment via the cooler. Thereby, here, under "integrated into the coolant circuit" and "connected to the coolant circuit", it is generally understood that the component and, in particular, also the high-voltage storage device are thermally connected to the coolant circuit by way of a suitable heater heat exchanger.

Depending on the requirements at hand, in a second HVS cooling mode, in particular, a dissipation of the heat source's waste heat occurs in addition to the dissipation of the high-voltage storage device's waste heat. By means of this, in particular, an overall cooling mode is implemented, where the waste heat of a plurality of the vehicle's components are emitted to the cooler via the common coolant circuit and then to the ambient environment. In addition, in particular, interior-space cooling is also possible by way of the refrigerant circuit. In a suitable manner, the heat source and the high-voltage storage device are connected to each other in parallel, meaning that they form two branches of the coolant circuit that are parallel to each other. Basically, it is conceivable to wire together a plurality of heat sources, which are then respectively interconnected in parallel or, as an alternative also in series or in a combination thereof. Connecting the high-voltage storage device and the heat source in parallel is implemented in a particularly easy way by way of the chiller bypass, which, in this situation, as was also mentioned in the above, serves as a return for the high-voltage storage device and as a connection of the same to the cooling circuit to form two parallel branches.

In a beneficial further embodiment, the heat source is arranged in the cooling circuit and connected to the chiller via the chiller bypass in heat pump mode to transfer the heat source's waste heat to the heater heat exchanger. Thereby, in particular, cooling the high-voltage storage device does not occur, but only cooling of the heat source. By way of the heat pump function of the refrigerant circuit, the waste heat is then transferred into the heating circuit and used there for interior-space heating. In heat pump mode, basically, there are four options available to supply the heater heat exchanger with heat: firstly, the high-voltage storage device with a combination of the heat pump mode with the first HVS cooling mode. Secondly, the heat source with a pure heat pump mode without cooling the high-voltage storage device. Thirdly, the cooler, if the coolant is cooled under the ambient temperature via the chiller so that heat absorption from the ambient environment into the coolant circuit takes place at the cooler. Fourthly, the air-conditioning evaporator in the air-conditioning unit, more precisely, in air-circulation mode of the interior, from which heat is taken via the air-conditioning evaporator during dehumidification, meaning a dehumidifying or reheating mode, or fresh-air mode, the ambient environment, whereby heat is then taken from the air flowing in from the outside, or in a mixed mode, a combination of both the aforementioned alternatives. Thereby, the third option is available in the pure heat pump mode in particular. In particular, the third option is available in both the first HVS cooling mode as well as in the pure heat pump mode.

In the case of interior-space heating by way of the heat source's waste heat, the direction of the coolant's flow along the chiller bypass is then in reverse with regard to the direction of flow in the second HVS cooling mode. Preferably, however, the chiller bypass is the only line section of the entire heating system, in which a reversal of flow direction occurs. On all other line sections, the coolant always flows in the same direction within the coolant circuit, independently of the operating mode, whereby the individual components are always flown through in their preferred direction and good venting of the cooling system is ensured. Also in the refrigerant circuit, the flow direction is continuously maintained and not reversed. This is why, on the one hand, a particularly simple set up is possible and, on the other, possible problems with the oil feedback are avoided.

In order to avoid that a partial flow of the coolant at the HVS branch before the chiller unintentionally flows into the direction of the high-voltage storage device during pure heat pump operation, meaning without HVS cooling mode, an HVS check valve favorably is arranged downstream from this and still before the HVS branch. By way of this, an unintentional inflow of coolant from the heat source toward the high-voltage storage means is hindered and, instead of this, the entire coolant flow is led over the chiller.

In order to separate the heating circuit and the cooling circuit from each other in the most effective way possible, the valve arrangement is activated in the first switch position in an appropriate manner, meaning the HVS-circuit pump is closed and, in particular, separated from the cooling circuit and from the heating circuit, however, the HVS-circuit pump is thereby not active so that no coolant circulates in the HVS circuit.

In the first HVS cooling mode, the cooling circuit pump is normally active. The cooling circuit valve is, in particular, activated in its first switch position so that the HVS circuit is separated from the cooling circuit and no exchange of coolant takes place between these two circuits.

In order to switch the heat supply to the heater heat exchanger in heat pump mode, namely between the heat supply from the high-voltage storage means or from the heat source, in another preferred embodiment, the heating system has a cooling circuit valve with a plurality of switch positions. In a first switch position, the high-voltage storage device is connected to the chiller and, in a second switch position, the heat source is connected to the chiller. In other words, by way of the cooling circuit valve, in heat pump mode, either a pure heat pump mode is set or, in addition, the first HVS cooling mode. Thereby, in an especially favorable way, a series connection of the heat source to the cooler is implemented in the first switch position at the same time so that, in this switch position, the high-voltage storage device is cooled via the refrigerant circuit and the heat source is cooled via the cooler.

The cooling circuit valve is expediently arranged upstream to the cooler and downstream from the chiller and, for example, designed as a three-way valve. Downstream from the heat source, the coolant circuit is then separated into two subsections that are parallel to each other, of which, the first includes the chiller bypass and the chiller and the other is a corresponding bypass. In this connection, meaning from the perspective of the heat source, the chiller bypass is, in particular, not a bypass, but rather a chiller feed line and the bypass is a circumvention with regard to the chiller.

In a beneficial further embodiment, the heating system has a cooler bypass to circumvent the cooler with a bypass valve. The cooler bypass is expediently activated depending on the ambient temperature. If the ambient temperature is lower than the temperature of the coolant at the cooler inlet, the bypass valve is opened in heat pump mode in particular, in particular only in pure heat pump mode. By way of this, in an especially simple manner on a constructive level, it is hindered that the waste heat from the heat source, which should primarily be used for interior-space heating, is lost due to the series connection to the cooler via exactly this. Instead of this, the waste heat remains in the cooling circuit until the coolant is added to the chiller again. If, on the contrary, the ambient temperature is greater than the coolant temperature at the cooler inlet, the bypass valve and thus the cooler bypass are expediently closed in order to absorb the heat via the cooler. The bypass valve is, for example, a simple stop valve.

In the case of simultaneously cooling the high-voltage storage device in the first HVS cooling mode, the status of the bypass valve is usually of minor importance. In a suitable embodiment, the bypass valve is opened and at least a partial flow of coolant is flown by the cooler so that the cooling of the heat source is reduced and the cooling circuit is operated in an optimum operating range.

The cooler can be designed either as an individual cooler unit or also as a cooler package. In the case of a cooler package, this includes a plurality of cooler units that are interconnected with each other in an appropriate way in parallel and/or in series. In an especially favorable embodiment however, the cooler has at least two cooler units, namely a main cooler unit and an auxiliary cooler unit. Here, a cooler branch is arranged downstream from the main cooler unit, at which a first coolant flow is led to the heat source and a second coolant partial flow is led to the auxiliary cooler unit and then to the heating circuit and to the HVS circuit. In other words, the overall cooling circuit flow in the cooling circuit is initially led over the main cooler unit and then the cooling flow, which is branched off from the cooling circuit to the heating circuit as well as to the HVS circuit via appropriate feeds, is initially still led over the auxiliary cooler unit. This embodiment is based on the idea that the high-voltage storage device, the condenser and the heat source respectively exhibit an optimal efficiency and performance at different feed temperatures. In particular, a higher feed temperature is still usually enough for the heat source. In accordance with this, the auxiliary cooler unit serves to more strongly cool the coolant, which is added to the high-voltage storage device and the condenser while warmer coolant is added to the heat source in comparison to this. By way of this, the respective feed temperature is optimally set.

For this reason, the main cooler unit and the auxiliary cooler unit are, in a first variation, designed as cooler sections connected to each other in a series that belong to an integrated cooler arrangement, where the coolant flows into the cooler and a coolant flow is branched off before completely flowing through the cooler and then added to the heat source. A corresponding branch is then arranged between both cooler sections so that the first cooler section flown through forms the main cooler unit and the following section forms the auxiliary cooler unit only run through by coolant flow. In a second variation, the main cooler unit and the auxiliary cooler unit are respectively designed as separate cooling units and are connected to each other via appropriate lines.

In a particularly preferred embodiment, an auxiliary heater is arranged in the heating circuit for an additional supply of heat in particular. The auxiliary heater is, for example, an electric flow heater. By way of the auxiliary heater, in the case of a possibly insufficient heat supply in heat pump mode, it is also ensured that sufficient heat is available for the interior-space heating in the heating circuit. The auxiliary heater serves, in particular, to compensate for a heat deficit in the heating circuit. In particular, this is determined by a coolant temperature in the heating circuit being measured and compared with a target temperature, wherein the auxiliary heater is then activated if the coolant temperature is lower than the target temperature. Expediently, the coolant temperature is measured directly before the heater heat exchanger, meaning upstream to the heater heat exchanger and downstream from the condenser.

In the heating circuit, the auxiliary heater is favorably arranged in such a way that this can also be used in an HVS heating mode of the heating system for heating the high-voltage storage device. In other words, in a favorable embodiment, the heating system has an HVS heating mode, in which the auxiliary heater and the high-voltage storage device are connected in series for heating the high-voltage storage device. In particular, this implemented by the auxiliary heater being arranged in the heating circuit downstream from the heater heat exchanger and upstream to the condenser and the heating circuit and the HVS circuit being directly connected to each other on a fluid-technical level via a cross connection so that a direct exchange of coolant between both circuits is made possible, meaning without a diversion via the cooling circuit. In addition, a heating circuit branch is arranged downstream from the auxiliary heater and in particular, upstream to the condenser, at which the cross connection branches off and is connected to the HVS circuit upstream to the high-voltage storage device so that the high-voltage storage device is arranged along the cross connection downstream from the auxiliary heater and then is supplied with heat in an especially simple manner.

Favorably, the cooling circuit valve in the HVS heating mode is set in its first switch position so that the coolant, which flows through the high-voltage storage device, then is specifically not led over the chiller, but instead, over the chiller bypass and over the cooling circuit again to the auxiliary heater. In this way, a thermodynamically unfavorable heating of the chiller is avoided and instead, the heat provided by the auxiliary heater is used especially efficiently, primarily all in all to heat the high-voltage storage device.

In the HVS heating mode in particular, in order to prevent an unintended flowing of coolant downstream from the chiller bypass into the direction of the heat source, a cooling circuit check valve is favorably arranged downstream from the heat source and, in particular, still before the branch to the chiller bypass accordingly.

In the case of the arrangement of the auxiliary heater downstream from the heater heat exchanger, it must be particularly ensured that the target temperature is measured for controlling the auxiliary heater furthermore preferably upstream to the heater heat exchanger and especially not in the proximity of the auxiliary heater. Nevertheless, in an expedient embodiment, a temperature sensor is arranged on the outlet of the auxiliary heater or, as an alternative, on the inlet of the high-voltage storage device in order to, particularly in the HVS heating mode, to measure the temperature of the heated coolant added to the high-voltage storage device and set an optimal coolant temperature for heating the high-voltage storage device.

If a heating of the interior room is not desired, the heating circuit is connected to the cooling circuit as described above and the coolant flows from the cooling circuit through the condenser, the heater heat exchanger and to the cooling circuit, in particular, without passing through the auxiliary heater. Thereby, the heating circuit is only flown through section by section and, as already described above, expediently secured by way of a heating circuit check valve. This is then arranged, in particular, between the auxiliary heater and the condenser so that, starting from the heating circuit feed line, the coolant can only flow in the direction of the condenser and not additionally also in the opposing direction to the auxiliary heater.

A heating of the high-voltage storage device is, in particular, practical when charging the high-voltage storage means and/or when starting the vehicle so that the HVS heating mode is activated preferably primarily or even only in a stationary mode before starting the vehicle in order to heat up the high-voltage storage device in a charging phase or in a warm-up phase to a preset operating temperature.

In order to easily feed heat to the high-voltage storage device from the auxiliary heater, the valve arrangement has a third switch status in a preferred further embodiment, in which the heating circuit is connected to the HVS circuit to feed heat from the auxiliary heater to the high-voltage storage device. Thereby, a variety of operating states can be easily set by way of the valve arrangement, namely the cooling of the high-voltage storage device via the refrigerant circuit, cooling the high-voltage storage device via the cooler and heating the high-voltage storage device via the auxiliary heater, meaning via the heating circuit.

Thereby, in a possible embodiment, the valve arrangement has a total of three inputs as well as one output, downstream from which the high-voltage storage device is arranged. The valve arrangement itself is, for example, implemented by way of two 3-way valves. As an alternative, an embodiment is also suitable as an individual 4-way valve. In the case of one embodiment of the valve arrangement with a plurality of valves, these are preferably arranged in spatial proximity with one another, meaning, in particular, spaced approximately 20 cm apart from each other as a maximum.

In an especially preferred embodiment, a plurality of the above-mentioned embodiments of the heating system are combined, and, in this way, an especially simple heating system is implemented on a switch-technical level, by way of which then both a cooling as well as a heating of the high-voltage storage device is possible. The cooling takes place via the refrigerant circuit or the cooler depending on the requirements at hand, in particular depending on the outer temperature. The heating is implemented especially simply via a double function of the auxiliary heater, which either serves to heat the high-voltage storage device, as mentioned beforehand, or to compensate for a heat deficit within the heating circuit for the purpose of interior room heating. In addition, in particular, in each of the aforementioned operating modes, an interior-space cooling is possible by way of the air-conditioning evaporator in the refrigerant circuit.

In the case of the special interconnection, the diverse valves and check valves as well as their positioning relative to the connected components are deemed to be quite significant. When interconnecting based on the various aforementioned valves, a heating system is implemented in an especially easy way on a constructive level, which supports the described operating modes, in part, also simultaneously. Thereby in particular, only the heating circuit valve, the cooling circuit valve, the bypass valve and the valve arrangement with one or two valves are required and otherwise, being favorable, no other switch and/or stop valves. In particular, the special interconnection then makes both a receptively separate operation of the three circuits possible as well as an interconnection with each other, meaning the heating circuit can be connected to the HVS circuit and both of these circuits can also be respectively connected separately to the cooling circuit. In addition, when connecting the heating circuit and the HVS circuit to the cooling circuit at the same time, three parallel branches are formed and by means of this, the heater heat exchanger with an upstream condenser, the high-voltage storage means and the heat source are connected in parallel to each other and respectively connected to the cooler or at least the main cooler unit in series. The check valves then hinder an undesired reversal of the flow in an efficient way.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
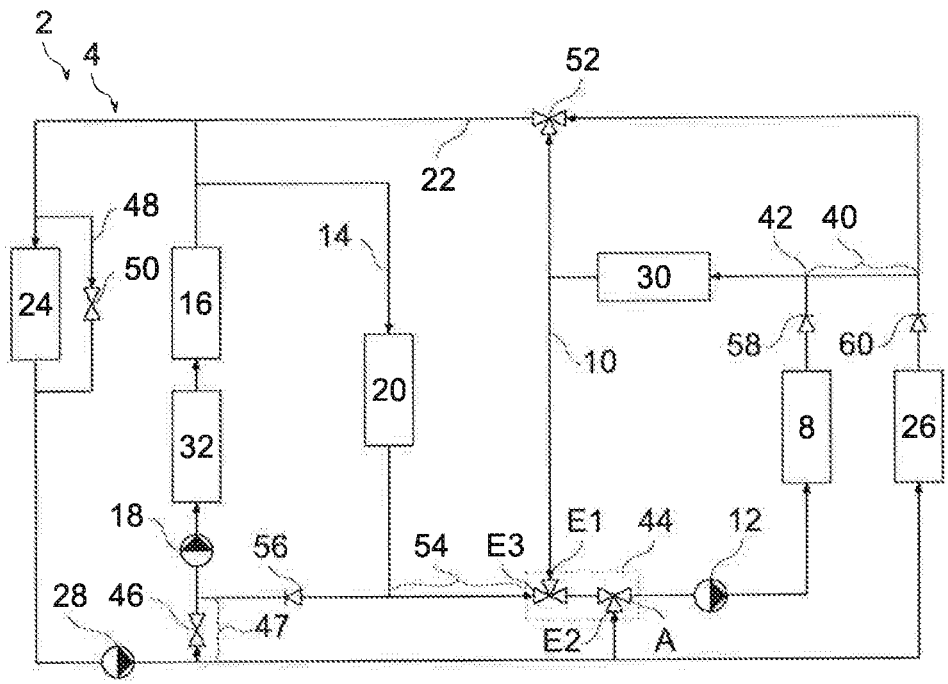
FIG. 1 is a schematic view of a first variation of a coolant circuit of a heating system.
Figure 2:
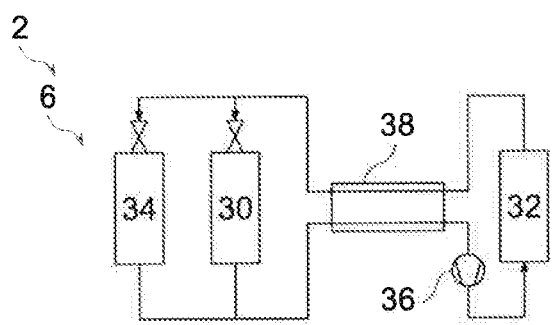
FIG. 2 is a schematic view of a refrigerant circuit of the heating system.

FIGS. 1 and 2 show a heating system 2 of a vehicle not illustrated further, wherein, in FIG. 1, a coolant circuit 4 of the heating system 2 is shown and in FIG. 2, a refrigerant circuit 6 is shown. The heating system 2 serves to air-condition diverse components of the vehicle, which are connected to the heating system 2 on a thermal level via suitable heater heat exchangers in order to emit or absorb heat.

The vehicle is an electric or hybrid vehicle with a high-voltage storage device 8, which is connected to the coolant circuit 4 for the purpose of air-conditioning. In addition, the high-voltage storage device 8 is initially connected to an HVS circuit 10, which is then part of the coolant circuit 4. To circulate coolant in the HVS circuit 10, a HVS-circuit pump 12 is additionally arranged in this. Furthermore, a heating circuit 14 is integrated into the coolant circuit 4, which has a heater heat exchanger 16 for interior-space heating. Additionally, a heating circuit pump 18 is arranged in the heating circuit 14 as well as an additional auxiliary heater 20 that is, for example an electrical flow heater. In addition to the HVS circuit 10 and to the heating circuit 14, the heating system 2 still has a cooling circuit 22, in which a cooler 24 and a heat source 26 are arranged. The heat source 26 is, for example, a drive train, charging or power electronics of the vehicle. For the coolant circulation, a cooling circuit pump 28 is arranged in the cooling circuit 22.

Furthermore, a chiller 30 and a condenser 32 are connected to the coolant circuit 4, which are also connected to the refrigerant circuit 6 shown in FIG. 2. Thereby, the chiller 30 acts as an evaporator in the refrigerant circuit 6 and all in all, serves to transfer heat from the coolant circuit 4 into the refrigerant circuit 6. The condenser 32 then serves to transfer heat from the refrigerant circuit 6 into the coolant circuit 4. Thereby, the chiller 30 in the HVS circuit 10 is connected downstream from the high-voltage storage device 8 and the condenser 32 in the heating circuit 16 is connected upstream to the heater heat exchanger 16.

The refrigerant circuit 6 furthermore has an air-conditioning evaporator 34, which, here, is connected in parallel to the chiller 30 and serves to cool an interior. The heater heat exchanger 16 and the air-conditioning evaporator 34 are then respectively an integral part of an unspecific air-conditioning unit for the air-conditioning of an interior. An unspecified expansion element is respectively connected upstream to the air-conditioning evaporator 34 and the chiller 30.

Furthermore, the refrigerant circuit 6 has a compressor 36 to compress the refrigerant before entry into the condenser 32. In an alternative not shown here, the refrigerant circuit 6 has two compressors 36 that are, in particular, identical in construction, which are then connected to each other in parallel. Additionally, in the embodiment shown here, an inner heater heat exchanger 38 is integrated into the refrigerant circuit 6 to increase efficiency and improve performance.

In the following, the special interconnection of the coolant circuit 4 shown in FIG. 1 is explained in further detail. Due to this interconnection, the heating system 2 can be operated in a plurality of operating modes, which are then outlined in combination with FIGS. 3a to 3e, wherein the line sections through which the coolant flows are displayed in a highlighted manner.

The three circuits 10, 14, 22 are integrated into the coolant circuit 4 in such a way that these can be optionally connected to each other respectively in order to implement a variety of operating modes of the heating system 2, wherein a plurality of operating modes can be set at the same time, whereby a maximum flexibility results in the air-conditioning of the connected components.

Figure 3A:
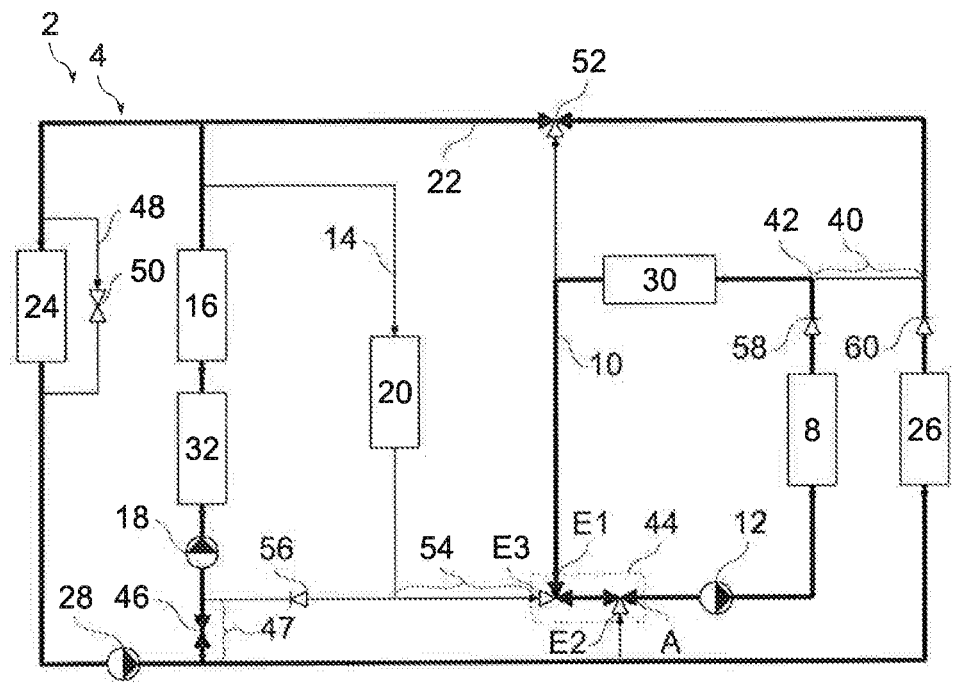
FIGS. 3a-3e are schematic views illustrating a respective operational state of the heating system.
Figure 3B:
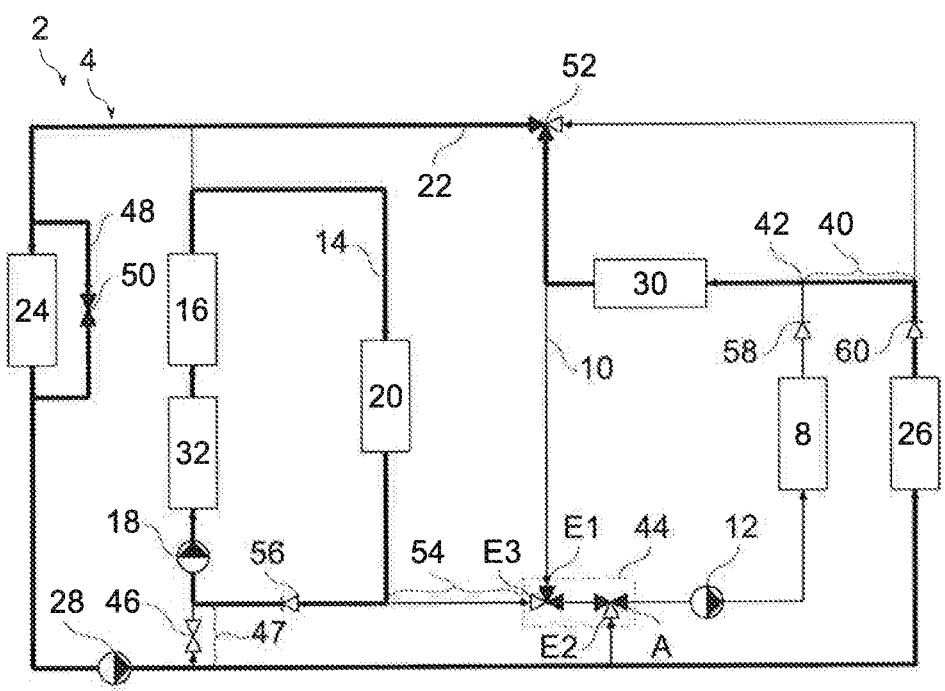
Figure 3C:
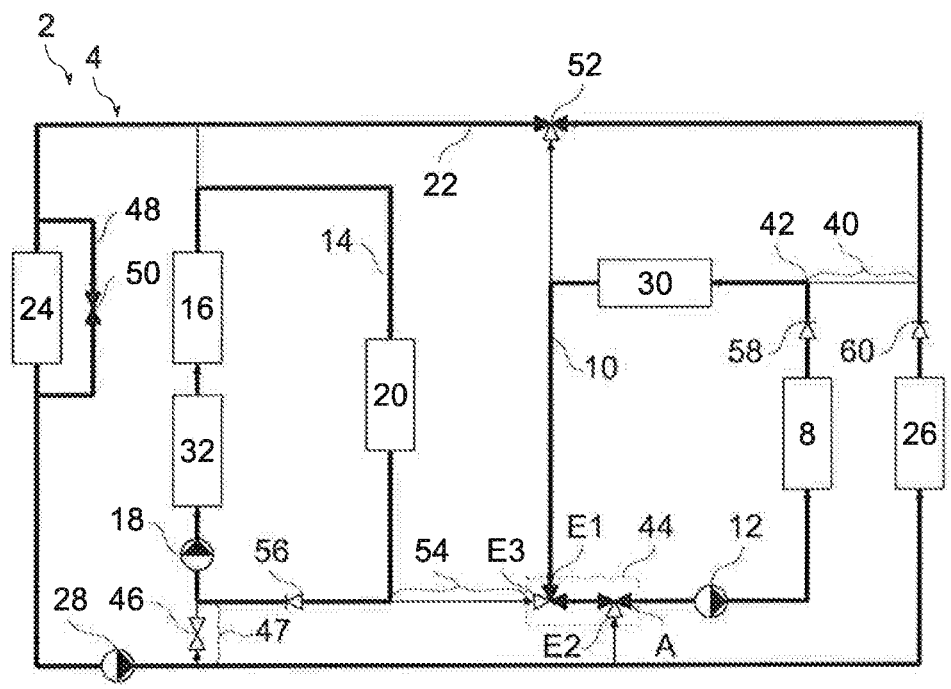

Initially, the HVS circuit 10 and the cooling circuit 22 are connected to each other via a chiller bypass 40. This extends from an HVS branch 42 downstream from the high-voltage storage device 8 and upstream to the chiller 30 up to one connection point on the cooling circuit downstream from the heat source 22. By way of the chiller bypass 40, it is then possible to dissipate the generated waste heat from the high-voltage storage device 8 either in a first HVS cooling mode via the chiller 20 into the refrigerant circuit 6 as is shown in FIGS. 3a and 3c or, in a second HVS cooling mode, to conduct it onward to the cooler 24 via the chiller bypass 40 and emit it there to the ambient environment as shown in FIG. 3d.

To switch between these two HVS cooling modes, a valve arrangement 44 is arranged upstream to the high-voltage storage device 8. Here, this has two 3-way valves, however, only one 4-way valve in a variation that is not shown here. In addition, in the variation shown here, the valve arrangement 44 has three inputs E1, E2, E3 as well as one output A, wherein the latter then leads to the high-voltage storage device 8. The valve arrangement 44 then has a plurality of switch positions, wherein, in a respective switch position, one of the inputs E1, E2, E3 is open and the other two are closed. The input E1 serves to return coolant to the high-voltage storage device 8, thereby forming the HVS circuit 10. In contrast, the input E2 connects the HVS circuit 10 to the cooling circuit 22. The input E3 connects the heating circuit 14 to the HVS circuit 10. In a first switch position, the input E1 is now open and the first HVS cooling mode is set, wherein coolant is then circulated in the HVS circuit 10 and recurrently flows through the high-voltage storage device 8 and the chiller 30. Thereby, the HVS circuit 16 is separated from the cooling circuit 22 as shown in FIGS. 3a and 3c.

Figure 3D:
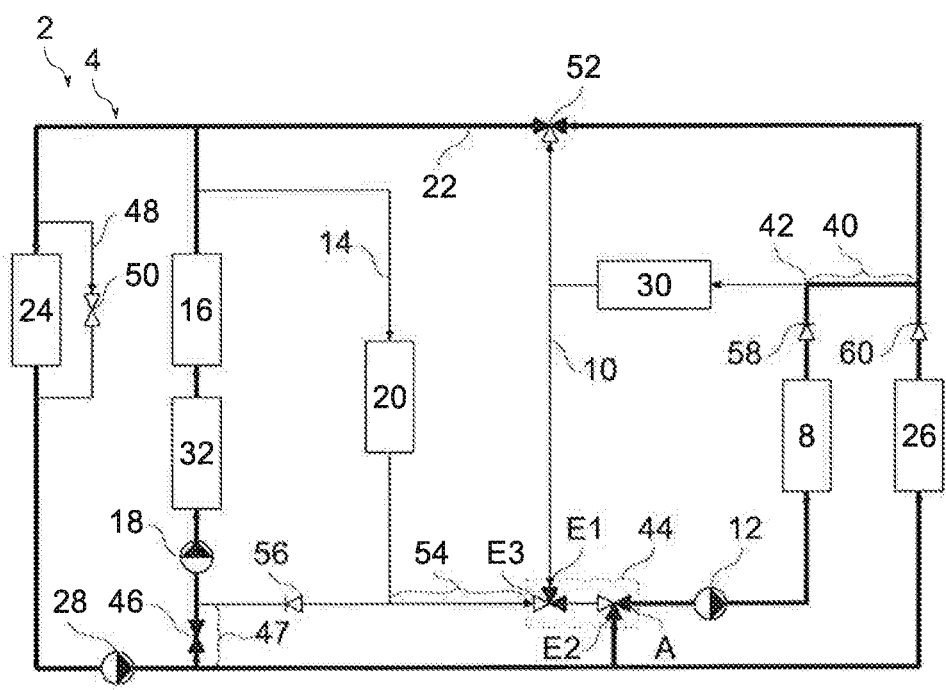

In a second switch position, in turn, the input E2 is open and the HVS circuit 10 is connected to the cooling circuit 22 so that coolant from the high-voltage storage device 8 reaches the cooler 24 via the chiller bypass 40, as shown in FIG. 3d. In addition, the input E1 is open and the input E3 is closed so that an inflow of coolant of the heating circuit 14 into the direction of the chiller 30 is hindered. Altogether, it becomes evident from this that the high-voltage storage device 8 is connected in parallel to the heat source 26 in this switch position. In accordance with this, the heat source 26 is cooled and its waste heat is added to the cooler 24. Due to the special interconnection however, a cooling of the heat source 26 is also ensured in the first HVS cooling mode via the cooler 24, as is clear from FIGS. 3a and 3c.

Due to the arrangement of the condenser 32 in the heating circuit 14 upstream to the heater heat exchanger 16, it is possible to implement a heat pump operation in order to transfer heat to the heater heat exchanger 16 via the refrigerant circuit 6 and use it there for interior-space heating. Thereby the heat pump mode is set by way of operating the heating circuit 14 separately from the cooling circuit 22 so that the coolant is recurrently led through the condenser 32 for heat absorption and through the heater heat exchanger 16 for emitting heat. In the exemplary embodiment shown, the separation is implemented by way of a heating circuit valve 46, which is designed here as a stop valve and is arranged in a heating circuit feed line 47, meaning a return flow of the heating circuit feed line 14. By opening the heating circuit valve 46, the heating circuit valve 14 is connected to the cooling circuit 22 and the condenser 32 as well as the heater heat exchanger 16 are connected to the cooler 24 in series; no interior-space heating takes place. Instead, the heat, which enters into the coolant circuit 4 via the condenser 32, is dissipated via the cooler 24, as shown in FIGS. 3a and 3d. By closing the heating circuit valve 46, the heat pump mode is then set as shown in FIGS. 3b and 3c. Thereby, the heat transferred into the heating circuit 14 either originates from the high-voltage storage device 8 as shown in FIG. 3c, meaning at the same time the heat pump mode is running, the first HVS cooling mode is active; or from the heat source 26 from the ambient environment and/or from the air-conditioning evaporator 34 from the refrigerant circuit 6 as shown in FIG. 3b, meaning no HVS cooling mode is active and the heat pump mode is a pure heat pump mode. In order to separate the heating circuit 14 and the cooling circuit 22 from each other in the most effective way possible, the inputs E2, E3 at the valve arrangement 44 are closed. If the input E1 is open, however, the HVS-circuit pump 12 is not active so that the HVS circuit 10 does not circulate any coolant.

Additionally, in heat pump mode, it is expedient in certain cases to circumvent the cooler 24 and prevent heat dissipation to the ambient environment. In addition, the heating system 2 has a cooler bypass 48 with a bypass valve 50, which is then opened in heat pump mode as shown in FIGS. 3b and 3c. However, it is especially evident from FIG. 3c that closing the bypass valve 50 can be especially useful in the pure heat pump mode. The full separation of the three circuits 10, 14, 22 from each other shown in FIG. 3c results in the heat source not being cooled via the chiller 30 so that a cooling via the cooler 24 takes place in the case of a corresponding cooling demand by closing the bypass valve 50. Closing the bypass valve 50 is also only useful if heat from the ambient environment should be taken via the cooler 24.

In order to switch between the pure heat pump mode and the heat pump mode in combination with the first HVS cooling mode, a cooling circuit valve 52 is arranged in the cooling circuit 22 with two switch positions accordingly. In addition, the cooling circuit valve 52 here is designed as a 3-way valve and arranged downstream both from the chiller 30 as well as the heat source 26. By switching the cooling circuit valve 52, the heat source 26 is connected to the cooler 24, meaning either to the intermediary chiller 30 as shown in FIG. 3b or directly as shown in FIG. 3c.

Figure 3E:
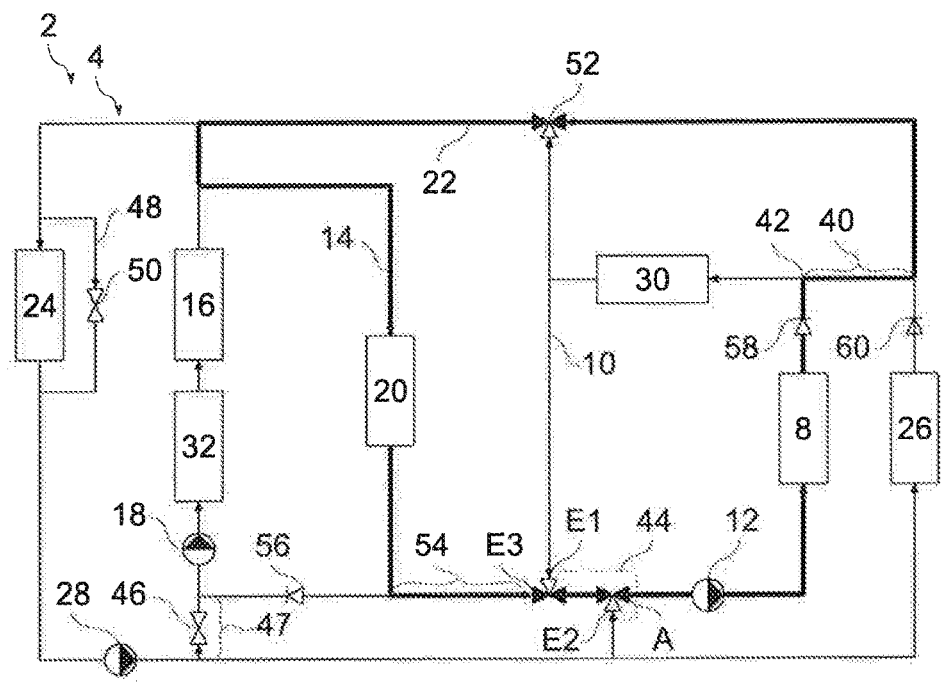

In the exemplary embodiment shown, the auxiliary heater 20 fulfills a double function and is used in two different operating modes to heat two different components, namely, on the one hand, for interior-space heating in the heat pump mode or to heat the high-voltage storage device 8 in an HVS heating mode, which is shown in FIG. 3e. For this HVS heating mode, the coolant circuit 4 has a cross connection 54, via which the heating circuit 14 is connected to the HVS circuit 10 downstream from the auxiliary heater 20. The connection to the HVS circuit takes place here via the input E3 of the valve arrangement 44. By opening this input E3, the auxiliary heater 20 is then arranged upstream to the high-voltage storage device 8 so that the coolant is initially heated by the auxiliary heater 20 and then fed to the high-voltage storage device 8. The cooling circuit valve 52 is then expediently activated in such a way that coolant specifically does not flow through the chiller 30 in order to avoid an unnecessary loss of heat by heating the chiller 30 and avoid the loss of hydraulic pressure, which then would have to be compensated by higher pumping performance. Principally, it is also conceivable, although less suitable to operate the cooling circuit valve 52 in its other switch position so that the chiller 30 is then flown through, wherein the refrigerant circuit 6 is in any case switched off so that no heat transfer takes place in this. In particular, the HVS heating mode is activated before and/or after a charging process of the high-voltage storage device 8 and not during the regular driving operation of the vehicle.

As is furthermore evident from FIGS. 3a and 3e, the three circuits 10, 14, 22 are respectively secured against reversing the direction of flow of the coolant by way of a check valve 56, 58, 60. Thereby, a heating circuit check valve 56 is arranged in the heating circuit 14 downstream from the auxiliary heater 20 and upstream to the condenser 32, which, in particular, in the case of a deactivated heat pump mode, hinders the unintended branching of the coolant downstream from the heating circuit feed line 47 and in the direction of the auxiliary heater 20. In the HVS circuit 10, there is then an HVS check valve 58 arranged downstream from the high-voltage storage device 8, which, in the pure heat pump mode according to FIG. 3c, prevents the penetration of coolant from the chiller bypass 40 in the direction of the high-voltage storage device 8. In the cooling circuit, a cooling circuit check valve 60 is only arranged downstream from the heat source 26, by way of which, in particular, a penetration of the coolant from the HVS circuit 10 in the direction of the heat source 26 is hindered.

Figure 4:
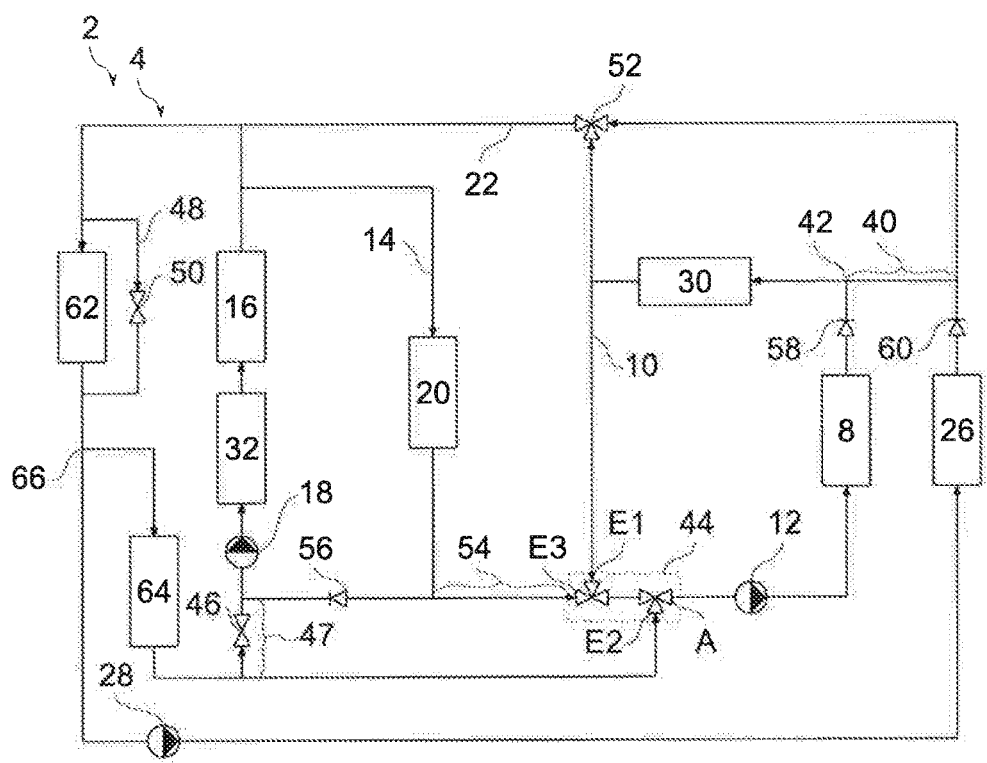
FIG. 4 is a schematic view of a second variation of the coolant circuit.

In the above-mentioned exemplary embodiment, the cooler 24 is portrayed as an individual cooler unit. FIG. 4 shows a suitable variation. Thereby the cooler has a plurality of cooler units 62, 64, namely a main cooler unit 62 and an auxiliary cooler unit 64. Thereby, the main cooler unit 62 is arranged like the cooler 24 from FIG. 1, meaning all of the coolant flows through the cooling circuit 22. In contrast, the auxiliary cooler unit 64 is arranged downstream from a cooler branch 66 so that a partial coolant flow is led by the auxiliary cooler unit 64 and is only cooled in the main cooler unit 62. This partial coolant flow is fed to the heat source 26. The remaining partial flow branched off at the cooler branch 66 is, on the contrary, additionally cooled via the auxiliary cooler unit 64 and then fed to the heating circuit 14 and the HVS circuit 10. In this way, various temperature levels for the coolant can be achieved before this flows through the various components to be cooled.

In a variation not shown here, the main cooler unit 62 and the auxiliary cooler unit 64 are respectively subsegments of the cooler 24 and the cooler branch 66 is arranged inside of the cooler 24 so that a partial coolant flow is already branched off before fully flowing through the cooler 24 and is fed to the heat source 26.

REFERENCE LIST

2 Heating system
4 Coolant circuit
6 Refrigerant circuit
8 High-voltage storage device
10 HVS circuit
12 HVS-circuit pump
14 Heating circuit
16 Heater heat exchanger
18 Heating circuit pump
20 Auxiliary heater
22 Cooling circuit
24 Cooler
26 Heat source
28 Cooling circuit pump
30 Chiller
32 Condenser
34 Air-conditioning evaporator
36 Compressor
38 Inner heater heat exchanger
40 Chiller bypass
42 HVS branch
44 Valve arrangement
46 Heating circuit valve
47 Heating circuit feed line
48 Cooler bypass
50 Bypass valve
52 Cooling circuit valve
54 Cross connection
56 Heating circuit check valve
58 HVS circuit check valve
60 Cooling circuit check valve
62 Main cooler unit
64 Auxiliary cooler unit
66 Cooler branch
A Output
E1, E2, E3 Input The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heating system for an electric or a hybrid vehicle, comprising:
    a refrigerant circuit; and
    a common coolant circuit, comprising:
        a heating circuit, including a heater heat exchanger configured for interior-space air-conditioning with a high-voltage storage device,
        an HVS circuit, including the high-voltage storage device, and
        a cooling circuit, including a cooler,
    wherein the heating circuit, the HVS circuit, and the cooling circuit define distinct closed loop paths that are integrated into the common coolant circuit,
    wherein in a first HVS cooling mode, the HVS circuit is separated from the cooling circuit and connected to a chiller for heat dissipation into the refrigerant circuit,
    wherein the common coolant circuit and the refrigerant circuit are thermally coupled at the chiller, and
    wherein in a second HVS cooling mode, the HVS circuit is connected to the cooling circuit via a chiller bypass for the heat dissipation via the cooler.

2. The heating system according to claim 1, further comprising:
    a valve arrangement with a plurality of switch positions to switch between the first and the second HVS cooling modes, wherein
    in a first switch position, the high-voltage storage device and the chiller are connected in series, and
    in a second switch position, the high-voltage storage device and the cooler are connected in series.

3. The heating system according to claim 2, wherein the valve arrangement has a third switch status, in which the heating circuit is connected to the HVS circuit to supply heat from an auxiliary heater to the high-voltage storage device.

4. The heating system according to claim 1, wherein the heating system has a heat pump mode, in which the heating circuit is separated from the cooling circuit and in which, by way of a condenser, which is arranged within the heating circuit, heat dissipation from the refrigerant circuit occurs for heating an interior.

5. The heating system according to claim 4, further comprising:
    a heating circuit valve, by way of which the heating circuit is separable from the cooling circuit.

6. The heating system according to claim 4, wherein the heating system is operable in the heat pump mode and in the first HVS cooling mode at the same time to supply the heater heat exchanger with the high-voltage storage device's waste heat by way of the chiller and the condenser.

7. The heating system according to claim 6, wherein a heat source is arranged in the cooling circuit, which is connected to the chiller via the chiller bypass to transfer the heat source's waste heat to the heater heat exchanger.

8. The heating system according to claim 7, further comprising:
    a cooling circuit valve with a plurality of switch positions to switch a heat supply to the heater heat exchanger in the heat pump mode, wherein
    in a first switch position, the high-voltage storage device is connected to the chiller and
    in a second switch position, the heat source is connected to the chiller.

9. The heating system according to claim 4, wherein a heat source is arranged in the cooling circuit, which is connected to the chiller via the chiller bypass to transfer the heat source's waste heat to the heater heat exchanger.

10. The heating system according to claim 9, further comprising:
    a cooling circuit valve with a plurality of switch positions to switch a heat supply to the heater heat exchanger in the heat pump mode, wherein
    in a first switch position, the high-voltage storage device is connected to the chiller and
    in a second switch position, the heat source is connected to the chiller.

11. The heating system according to claim 4, further comprising:
    a cooler bypass to circumvent the cooler with a bypass valve.

12. The heating system according to claim 11, wherein the cooler includes at least two cooling units, which are a main cooler unit and an auxiliary cooler unit, wherein, downstream from the main cooler unit, a cooler branch is arranged, at which a first partial coolant flow is led to a heat source and a second partial coolant flow is led to the auxiliary cooler unit and then to the heating circuit and to the HVS circuit.

13. The heating system according to claim 12, wherein an auxiliary heater is arranged in the heating circuit to add heat.

14. The heating system according to claim 13, wherein the heating system has a HVS heating mode, in which the auxiliary heater and the high-voltage storage device are connected in series to heat the high-voltage storage device.

15. The heating system according to claim 14, wherein the valve arrangement has a third switch status, in which the heating circuit is connected to the HVS circuit to supply heat from the auxiliary heater to the high-voltage storage device.

16. The heating system according to claim 1, wherein the cooler includes at least two cooling units, which are a main cooler unit and an auxiliary cooler unit, wherein, downstream from the main cooler unit, a cooler branch is arranged, at which a first partial coolant flow is led to a heat source and a second partial coolant flow is led to the auxiliary cooler unit and then to the heating circuit and to the HVS circuit.

17. The heating system according to claim 1, wherein an auxiliary heater is arranged in the heating circuit to add heat.

18. The heating system according to claim 17, wherein the heating system has a HVS heating mode, in which the auxiliary heater and the high-voltage storage device are connected in series to heat the high-voltage storage device.

19. The heating system according to claim 1, wherein in the refrigerant circuit, a compressor is arranged as well as an additional compressor, which is connected to the compressor in parallel to increase performance of the refrigerant circuit according to the needs at hand.

20. A method for operating a heating system for an electric or a hybrid vehicle, the method comprising the acts of:
    providing a refrigerant circuit; and
    providing a common coolant circuit, comprising:
        a heating circuit that includes a heater heat exchange for interior-space air-conditioning with a high-voltage storage device,
        an HVS circuit that includes the high-voltage storage device, and
        a cooling circuit that includes a cooler,
        wherein the heating circuit, the HVS circuit, and the cooling circuit define distinct closed loop paths that are integrated into the common coolant circuit, and
        wherein the common coolant circuit and the refrigerant circuit are thermally coupled at the chiller;
    in a first HVS cooling mode, separating the HVS circuit from the cooling circuit and connecting the HVS circuit to a chiller, by way of which waste heat from the high-voltage storage device is transferred to the refrigerant circuit; and
    in a second HVS cooling mode, connecting the HVS circuit to the cooling circuit via a chiller bypass so that waste heat from the high-voltage storage device is dissipated via the cooler.

* * * * *